C. A. OMAN.
LAWN MOWER SHARPENER.
APPLICATION FILED NOV. 23, 1915.
1,211,338.
Patented Jan. 2, 1917.
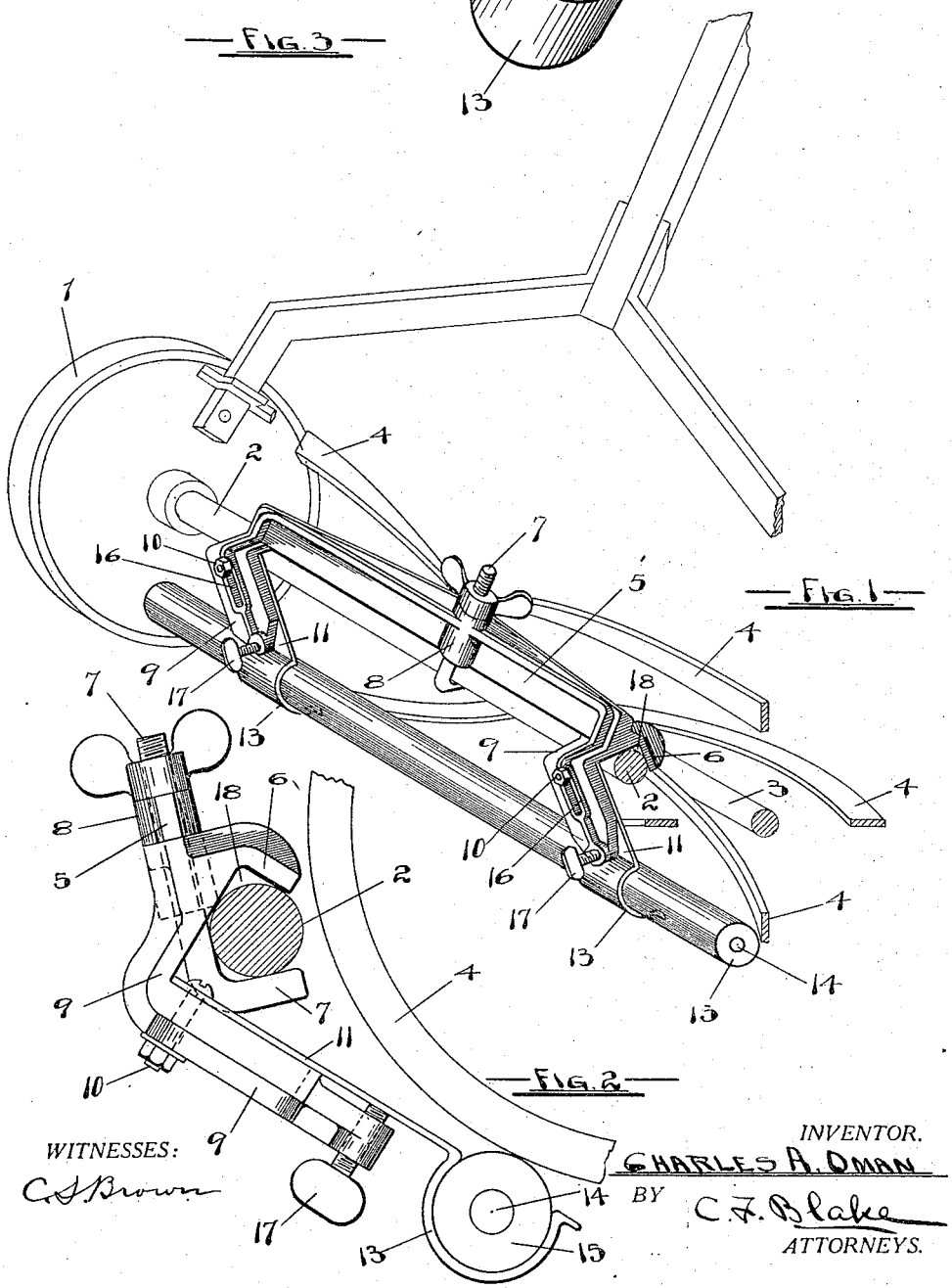
INVENTOR.
CHARLES A. OMAN
BY C. F. Blake
ATTORNEYS.
WITNESSES:
C. S. Brown

UNITED STATES PATENT OFFICE.

CHARLES A. OMAN, OF PORTLAND, OREGON.

LAWN-MOWER SHARPENER.

1,211,338.  Specification of Letters Patent.  Patented Jan. 2, 1917.

Application filed November 23, 1915. Serial No. 63,019.

*To all whom it may concern:*

Be it known that I, CHARLES A. OMAN, a citizen of the United States, residing at Portland, county of Multnomah, State of Oregon, have invented certain new and useful Improvements in Lawn-Mower Sharpeners, of which the following is a specification.

My invention relates to devices for sharpening lawn mowers, and more particularly to that class of such devices as are adapted to be mounted upon the mower and operated by running said mower.

The objects of my invention are: to provide such a device that shall be cheap to manufacture, of light weight and few parts; to provide a device that shall easily be attached to the cross rod of a mower even should said cross rod be somewhat bent; to provide a device that shall be applicable to mowers of various widths without adjustment; to provide in such a device means whereby all portions of the abrasive material may be presented for contact with the mower knives thereby insuring economy because the entire abrasive may be used up; to provide in such a device means whereby the abrasive member may easily be adjusted to contact evenly along the entire length of the mower knives as same are operated; to provide a slightly yielding contact between the abrasive member and the mower knives; to provide easy and permanent adjustment for various positions of the mower cross bar relative to the mower knives.

I accomplish the above objects by means of the construction described herein and illustrated in the accompanying drawing, which therefore becomes a part of this application for Letters Patent, and in which:

Figure 1 is a diagrammatic perspective view of a portion of a lawn mower, showing my invention attached thereto. Fig. 2 is an end elevation of my invention. Fig. 3 is a perspective view of the spring clip for holding the abrasive member.

Like characters of reference indicate like parts throughout the several views in which:

Number 1 is the mower wheel, 2 the mower cross bar to which I attach my invention, 3 the mower knife axle and 4 the mower rotary knives.

To attach my invention to the cross bar 2, and to provide for accommodations should said cross bar become slightly bent, I provide a three point method of attachment by means of a bar 5 adapted to lie substantially parallel to cross bar 2 and provided at each end thereof, and substantially normal thereto, with hooked projections 6 adapted to engage said cross bar 2 and a hook bolt 7 mounted within a boss 8 centrally located upon bar 5, said hook-bolt 7 being adapted to draw said hooked projections 6 into contact with cross bar 2, as shown in Figs. 1 and 2.

To support the abrasive I provide at each end of the bar 5 and substantially normal thereto, L shaped extensions or arms 9, said arms being in substantially the same plane as the hooked projections 6 and upon the opposite side of bar 5 relative to said hooked projections; secured by bolts 10 to each of said arms 9 I provide a clip 11 provided at one end with an orifice 12 to receive bolt 10 and at the other end with a bent portion 13 adapted to receive and to hold the abrasive member.

To provide, for economical purposes, that all portions of the abrasive member shall be used, I form said member as a cylinder, said cylinder consisting of a core 14 of iron or other suitably strong material surrounded by the abrasive material 15 molded upon said core 14, and the bent portion 13 of clip 11 is formed to partially surround said cylindrical abrasive member, thereby allowing same to be turned within said hook 13 to present all portions of the abrasive member to the mower knives.

To provide a yielding contact between the abrasive member 15 and the rotating mower knives 4 I form clip 11 from spring steel or other metal having suitable qualities.

To provide adjustment for various relative positions of cross bar 2 and knives 4 I provide longitudinal slots 16 in arms 9 adapted to receive bolts 10 securing clips 11 and thereby allow said clips to be extended longitudinally from arms 9 if desired.

To provide adjustability of the abrasive member for the purpose of securing proper contact throughout the length of the rotating knives 4 I mount upon the end of each arm 9 a thumb screw 17 each adapted to bear upon its respective clip 11 and to move same toward the knives 4; by adjusting each of said thumb screws independently the abrasive member may be brought into perfect parallelism with the rotating mower knives.

To provide for accommodating various sizes of cross rods 2 I form the hooked projections 6 with a reëntrant angle 18 upon the face thereof adjacent said cross rod 2, into which reëntrant angle said cross rod is drawn by means of hook-bolt 7.

Because of the symmetrical design which I have incorporated in my invention same may be reversed from the position shown in Fig. 1, and may be placed upon cross rod 2 with abrasive member 15 above and to the rear of said cross rod, thereby adapting my invention to use upon mowers wherein the cross-rod 2 is located so low as not to permit the attachment of my invention as shown in Fig. 1.

My invention may be made of any size and constructed of any materials deemed desirable and suitable in a device of this character, and while I have illustrated and described a preferred form of construction and arrangement of parts found desirable in materializing my invention, I wish to include in this application for Letters Patent all mechanical equivalents and substitutes that may fairly be considered to come within the scope and purview of my invention as defined in the appended claims.

Having thus described my invention so that others skilled in the art may be enabled to construct and use same, what I claim as new, and desire to secure by Letters Patent is:

1. In a lawn mower sharpener, a clamp secured to the cross rod of the mower and comprising a beam substantially parallel to said cross rod, a duality of hooked extensions, one at each end of said beam and integral therewith, each of said extensions engaging said mower cross rod, and a hooked bolt passing through said beam intermediate said extensions and engaging said mower cross rod; a duality of L shaped arms, one at each end of said beam and integral therewith; a cylindrical abrasive member; and a duality of spring clips adjustably mounted upon said L shaped arms, and having hooked ends formed thereon partially surrounding said abrasive member and rotatably supporting the same.

2. A lawn mower sharpener, comprising a clamp to secure the sharpener to the cross rod of the mower; a cylindrical abrasive member; a duality of resilient supporting members each partially surrounding said abrasive member and rotatably supporting the same therein; means for attaching the said supporting members at one end thereof respectively to said clamp; and means acting upon the supporting members between the attaching means and the abrasive member holding means for adjusting the supporting members.

In witness whereof I claim the foregoing as my own I hereunto affix my signature in the presence of two subscribing witnesses.

CHARLES A. OMAN.

Witnesses:
C. C. MOORE,
L. J. ROBINSON.

Copies of this patent may be obtained for five cents each, by addressing the "Commissioner of Patents, Washington, D. C."